(12) United States Patent
Hopkins et al.

(10) Patent No.: US 10,230,124 B2
(45) Date of Patent: Mar. 12, 2019

(54) GRAVITY INDUCED FLOW CELL

(71) Applicant: Massachusetts Institute of Technology, Cambridge, MA (US)

(72) Inventors: Brandon James Hopkins, Cambridge, MA (US); Alexander H. Slocum, Bow, NH (US); Xinwei Chen, Cambridge, MA (US); Yet-Ming Chiang, Weston, MA (US); Frank Yongzhen Fan, Cambridge, MA (US); Ahmed Helal, Cambridge, MA (US); Zheng Li, Arlington, MA (US); Kyle C. Smith, Champaign, IL (US); W. Craig Carter, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 23 days.

(21) Appl. No.: 14/557,924

(22) Filed: Dec. 2, 2014

(65) Prior Publication Data
US 2015/0155585 A1   Jun. 4, 2015

Related U.S. Application Data

(60) Provisional application No. 61/911,101, filed on Dec. 3, 2013, provisional application No. 61/912,215, filed on Dec. 5, 2013.

(51) Int. Cl.
| | |
|---|---|
| *H01M 8/18* | (2006.01) |
| *H01M 8/20* | (2006.01) |
| *H01M 8/04276* | (2016.01) |

(52) U.S. Cl.
CPC ....... *H01M 8/188* (2013.01); *H01M 8/04276* (2013.01); *H01M 8/20* (2013.01); *Y02E 60/528* (2013.01)

(58) Field of Classification Search
CPC .... H01M 8/188; H01M 8/04276; H01M 8/18; H01M 8/20; Y02E 60/528
See application file for complete search history.

(56) References Cited

U.S. PATENT DOCUMENTS

| | | | | |
|---|---|---|---|---|
| 5,318,865 A | * | 6/1994 | Kaneko | B60L 11/1868 429/345 |
| 6,358,643 B1 | * | 3/2002 | Katz | C07C 227/32 429/105 |

(Continued)

FOREIGN PATENT DOCUMENTS

| | | | |
|---|---|---|---|
| WO | WO 2012083239 A1 * | 6/2012 | .......... H01M 8/188 |
| WO | 2014/121276 A3 | 8/2014 | |

OTHER PUBLICATIONS

"Notification of Transmittal of the International Search Report and the Written Opinion of the International Searching Authority, or the Declaration" for PCT/US2014/068342, dated Apr. 23, 2015.

(Continued)

*Primary Examiner* — Stewart A Fraser
(74) *Attorney, Agent, or Firm* — Wolf, Greenfield & Sacks, P.C.

(57) ABSTRACT

The flow cell includes first and second reservoirs having a selected volume containing a flowable redox electrode. A membrane separates charged and discharged material. An energy-extraction region includes electronically conductive porous current collectors through or adjacent to which the flowable redox electrodes flow and to which charge transfer occurs. Structure is provided for altering orientation of the flow cell whereby gravity induces flow of the flowable redox electrode between the first and second reservoirs to deliver power. By varying the angle of the cell, flow rate and power delivered on discharge or the charge rate on charge may be varied.

19 Claims, 7 Drawing Sheets

(56) References Cited

U.S. PATENT DOCUMENTS

| | | | | |
|---|---|---|---|---|
| 6,509,119 B1* | 1/2003 | Kobayashi | ............... | C01B 31/04 423/445 R |
| 8,722,227 B2 | 5/2014 | Chiang | | |
| 2010/0003545 A1* | 1/2010 | Horne | ................. | B60L 11/1824 429/471 |
| 2011/0200848 A1* | 8/2011 | Chiang | ............... | B60L 11/1875 429/4 |
| 2012/0135278 A1* | 5/2012 | Yoshie | .................. | H01M 8/188 429/7 |
| 2013/0260204 A1* | 10/2013 | Xiao | ...................... | H01M 4/525 429/105 |
| 2016/0126581 A1* | 5/2016 | Timofeeva | ............ | H01M 8/188 429/81 |

OTHER PUBLICATIONS

Hopkins. Mechanical Design of flow batteries (Master Thesis). Mar. 16, 2013. Massachusetts Institute of Technology.

Fan et al. Polysulfide Flow Batteries Enabled by Percolating Nanoscale Conductor Networks. Nano Letters. Apr. 9, 2014, pp. 2210-2218, vol. 14(4), American Chemical Society, Washington DC.

Medeiros et al. Magnesium-solution phase catholyte semi-fuel cell for undersea vehicles. Journal of Power Sources, Oct. 1, 2004, pp. 226-231, vol. 136(2), Elsevier.

Lei et al. An Alkaline Al—H2O2 Semi-Fuel Cell Based on a Nickel Foam Supported Co3O4 Nanowire Arrays Cathode. Fuel Cells. Jun. 25, 2011, pp. 431-435, vol. 11(3), Wiley-VCH Verlag GmbH & Co KGaA. Weinheim, Germany.

Duduta et al. Semi-Solid Lithium Rechargeable Flow Battery. Advanced Energy Materials, Jul. 20, 2011, pp. 511-516, vol. 1(4), Wiley-VCH Verlag GmbH & Co. KGaA. Weinheim, Germany.

Li et al. Aqueous semi-solid flow cell: demonstration and analysis. Physical Chemistry Chemical Physics. Jan. 1, 2013, pp. 15833-15839, vol. 15(38). Royal Society of Chemistry.

International Preliminary Report on Patentability dated Jun. 7, 2016 for PCT/US2014/068342.

Leung et al., Progress in redox flow batteries, remaining challenges and their applications in energy storage. RSC Adv. 2012;2:10125-56.

* cited by examiner

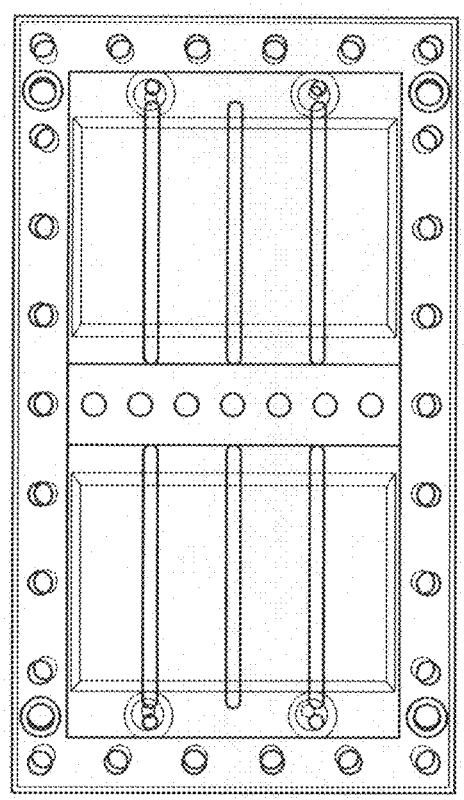
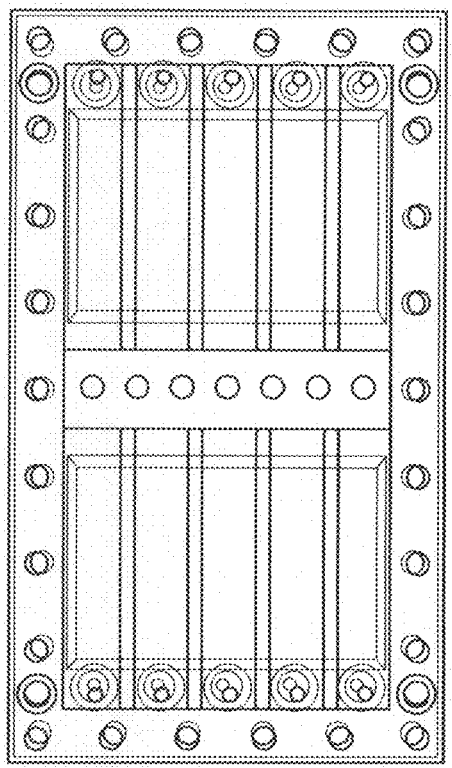
FIG. 6
FIG. 7
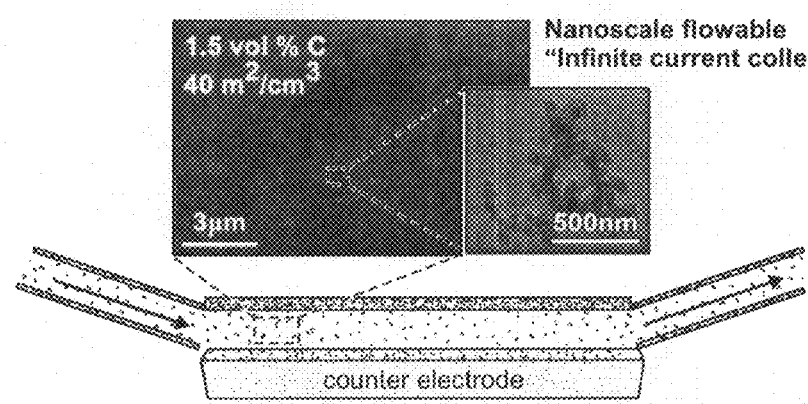
FIG. 8

GRAVITY INDUCED FLOW CELL

This application claims priority to provisional application Ser. No. 61/911,101 filed on Dec. 3, 2013 and to provisional application Ser. No. 61/912,215 filed on Dec. 5, 2013, the contents of both provisional applications of which are incorporated herein by reference in their entirety.

GOVERNMENT FUNDING

This invention was made with Government support under Grant Nos. DE-AR0000065 and DE-AC02-06CH11357 awarded by the Department of Energy. The government has certain rights in the invention.

BACKGROUND OF THE INVENTION

This invention relates to flow cells and more particularly to a flow cell that uses gravity to flow a redox electrode from one reservoir or tank to a second reservoir or tank to deliver power.

Flow batteries are known. Conventional flow batteries are often very large and include multiple pumps, valves and sensors operated by complex control systems. Such prior art flow batteries are often leaky.

FIG. 1 is an illustration of a conventional flow battery architecture. In FIG. 1, a cathode tank 10 and an anode tank 12 provide flowable electrodes through current collectors 14 and 16 separated by a membrane 18. Pumps 20 and 22 circulate the respective flow electrodes. This arrangement is not optimal for electronically conductive anode and cathode material.

An object of the present invention is a gravity induced flow cell that requires no pumps and no valves and is passively driven by gravity. It is also an object of the invention to provide a gravity induced flow cell that may be manufactured using simple low cost parts and methods, including but not limited to stackable injection-molded plastic parts.

SUMMARY OF THE INVENTION

The gravity induced flow cell according to the invention includes first and second reservoirs having a selected volume containing a flowable redox electrode. A membrane is provided separating charged and discharged material. The flow cell includes an energy-extraction region including electronically conductive current collectors through or adjacent to which the flowable redox electrodes flow and to which charge transfer occurs. Optionally, the current collector is a plate, a plate containing channels to direct flow and/or increase surface area, a porous stationary electronically conductive material, or a percolating network of conductor particles or fibers that flows with the electrode. Structure is provided for altering orientation of the flow cell with respect to gravity whereby gravity induces flow of the flowable redox electrodes between the first and second reservoirs. In a preferred embodiment, by varying the angle of the cell, flow rate and power delivered on discharge or the charge rate on charge may be varied. It is preferred that the cell include a motor to vary the angle of the cell with respect to gravity.

In a preferred embodiment, the energy extraction region has a volume and ratio of the volume of the energy-extraction region to reservoir volume is selected to be in the range of about 1 to about 1000. Pneumatic pressure may be added to alter flow rate in addition to that induced by gravity. Valves may be included if desired to modulate flow rates.

In another preferred embodiment, a stationary current collector includes carbon. The carbon may be selected from the group consisting of glassy carbon, disordered carbon, graphite, and nanoparticulate carbon including fullerenes, carbon nanofibers and carbon nanotubes, graphene, and graphene oxide. The carbon may be in the form of a carbon plate, plate with nonplanar surface features including channels, compacted fibers, woven fibers, paper or 3D reticulated foam. A stationary current collector may be a carbon coating on a support or substrate comprising an insulating or conductive material.

In another preferred embodiment, the stationary current collector is a metal or metal alloy such as aluminum, copper, nickel and stainless steel. The metal or metal alloy may be in the form of a metal plate, plate with non-planar surface features including channels, compacted metal fibers, woven metal fibers, or 3D reticulated metal foam. A stationary current collector may be a metal or metal alloy coating on a support or substrate comprising an insulating or conductive material.

In another preferred embodiment the stationary current collector is a metal oxide, preferably an electronically conductive metal oxide such as indium-tin-oxide (ITO), titanium oxide with a oxygen/titanium atomic ratio less than 2, vanadium oxide with oxygen/vanadium atomic ratio less than about 2.5, ruthenium oxide, a transition metal oxide, a perovskite oxide including but not limited to $(La,Sr)MnO_3$, a spinel oxide including but not limited to spinels containing the transition metals Fe, Co, Mn and Ni, and mixtures and doped variants of such oxides including those doped to impart n-type or p-type electronic conductivity. The metal oxide may be in the form of a metal oxide plate, plate with nonplanar surface features including channels, metal fibers, or porous sintered metal oxide. A stationary current collector may be a metal oxide coating on a support or substrate comprising an insulating or conductive material.

In a particularly preferred embodiment, the flowable redox electrode is a suspension and the suspension may include conductor particles as well as active material particles. Due to the existence of a percolating electronically conductive network in such suspensions, the percolating network itself acts as an extended, mobile current collector allowing for the electrochemical reaction throughout the volume of the flow electrode. Such active materials suspensions have been described in U.S. Pat. No. 8,722,227B2. Another preferred flowable redox electrode is metal sulfide composition such as described in PCT/US2014/014681. The contents of both of these references are incorporated herein by reference. The flowable redox electrode working ion is an alkaline ion selected from the group consisting of $Li^+$, $Na^+$, $K^+$ and $Cs^+$. The working ion may also be a divalent ion of magnesium or calcium. The working ion may also be a trivalent ion of aluminum or yttrium. It is also preferred that the reservoirs and energy-extraction region include a slippery, low friction or non-wetting surface.

BRIEF DESCRIPTION OF THE DRAWING

FIG. 6 a schematic illustration of another embodiment of the invention disclosed herein.

FIG. 7 is a schematic illustration of another embodiment of the invention disclosed herein.

FIG. 8 is a schematic illustration of a flow battery in which the redox solutions contain nanoscale conductor networks forming an infinite current collector.

FIG. 9a a control valve system is placed in the gas flow channel to control the gas flow rate. FIG. 9b the control valve can be replaced by a porous media with known permeability.

FIG. 10a comparison between a surface with stainless steel and Teflon. FIG. 10b comparison with various permeability. The parameter a is defined to be $\alpha = L\mu/k_a$ where L is the thickness of the membrane (m), μ is the viscosity of the gas (Pa·s), k is the permeability of porous membrane (m²) and A is the cross-sectional area of the membrane (m²).

DESCRIPTION OF THE PREFERRED EMBODIMENT

Figure 1:
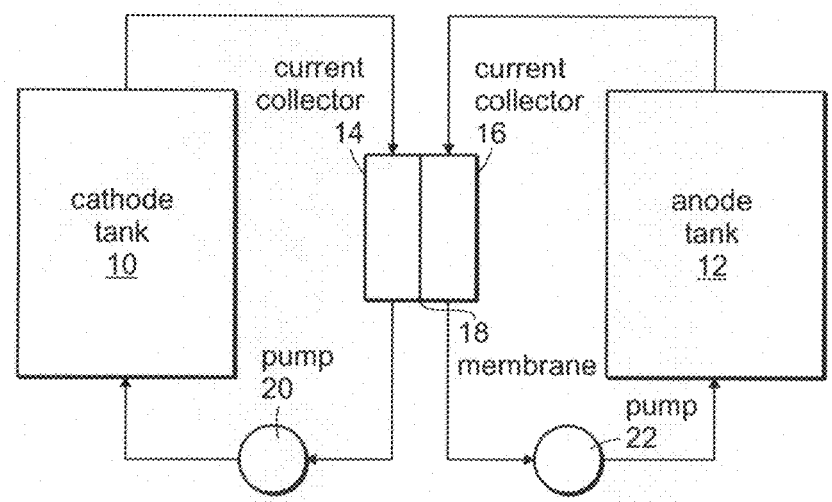
FIG. 1 is a schematic illustration of a prior art flow battery.
Figure 2:
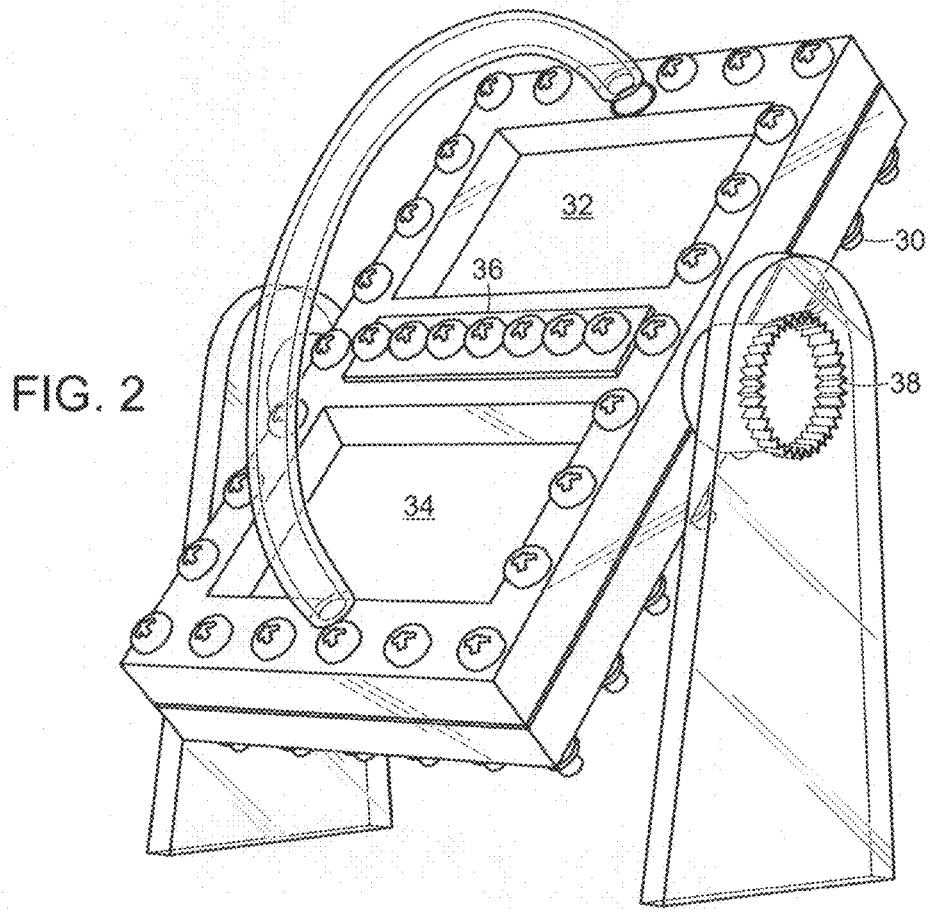
FIG. 2 is a perspective view of an embodiment of the gravity induced flow cell of the invention.
Figures 3A, 3B:
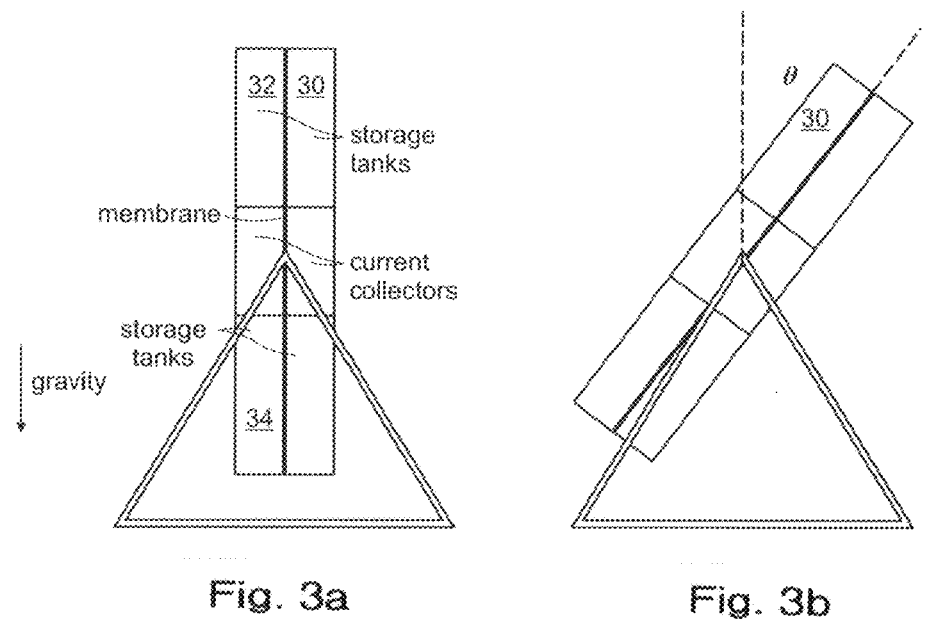
FIGS. 3a and 3b are cross-sectional views of an embodiment of the gravity induced flow cell disclosed herein.
Figure 4:
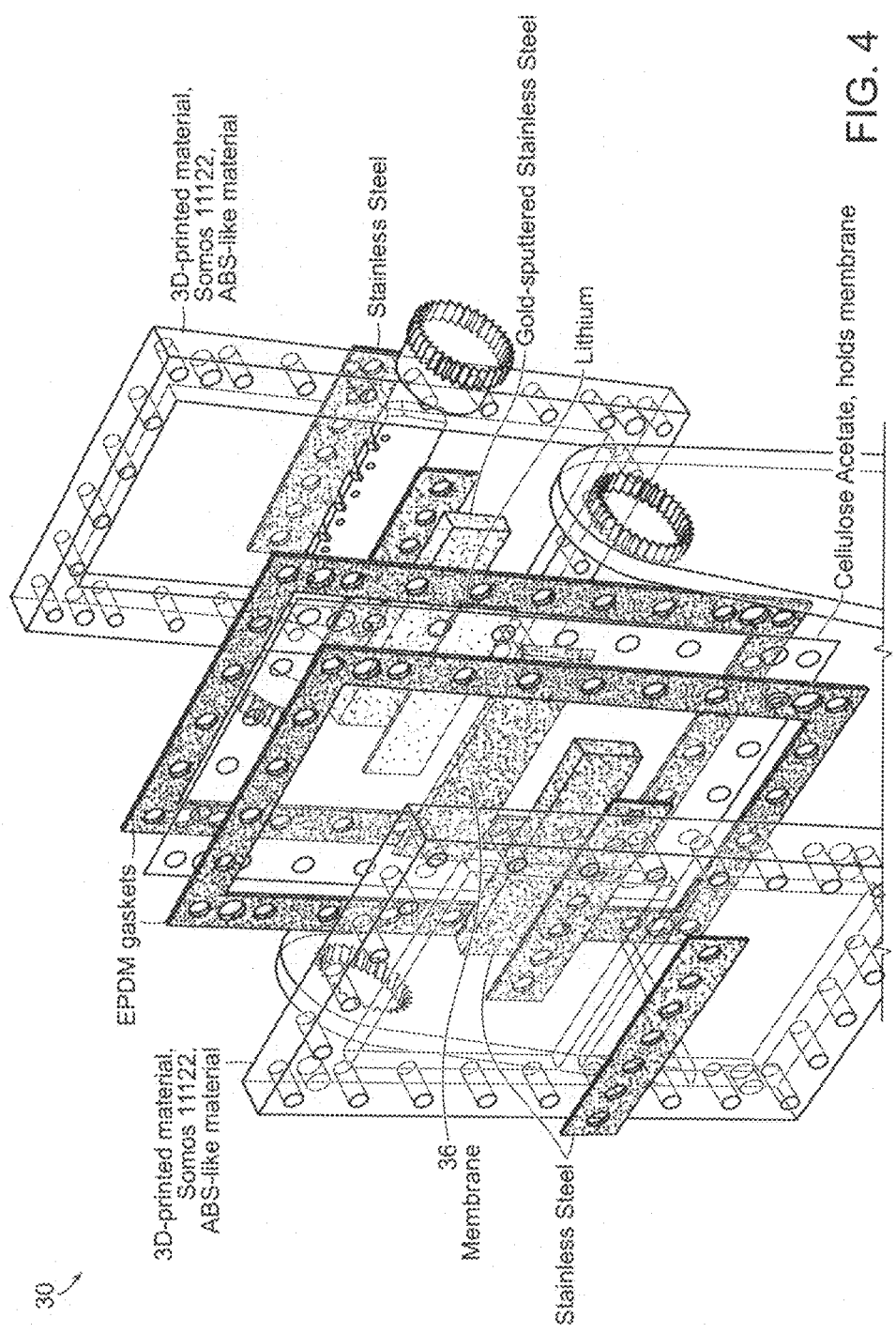
FIG. 4 is an exploded view of an embodiment of the invention disclosed herein.

With reference now to FIGS. 2, 3 and 4, a gravity induced flow cell 30 includes storage tanks 32 and 34. A membrane and current collector region is shown at 36. The angle that the flow cell 30 makes with respect to gravity is adjusted by means of the structure 38 that may also include an electric motor for varying the angle. FIG. 3b illustrates the gravity induced flow cell 30 positioned at an angle θ.

FIG. 4 is an exploded view of the flow cell 30. It is preferred that the material that houses the suspension is selected to be electrochemically compatible with the liquid electrolyte used. For nonaqeuous electrolytes, and electrolytes comprising alkyl-carbonates in particular, a suitable material is an ABS-like plastic (Watershed XC 11122, DSM Somos).

Figure 5:
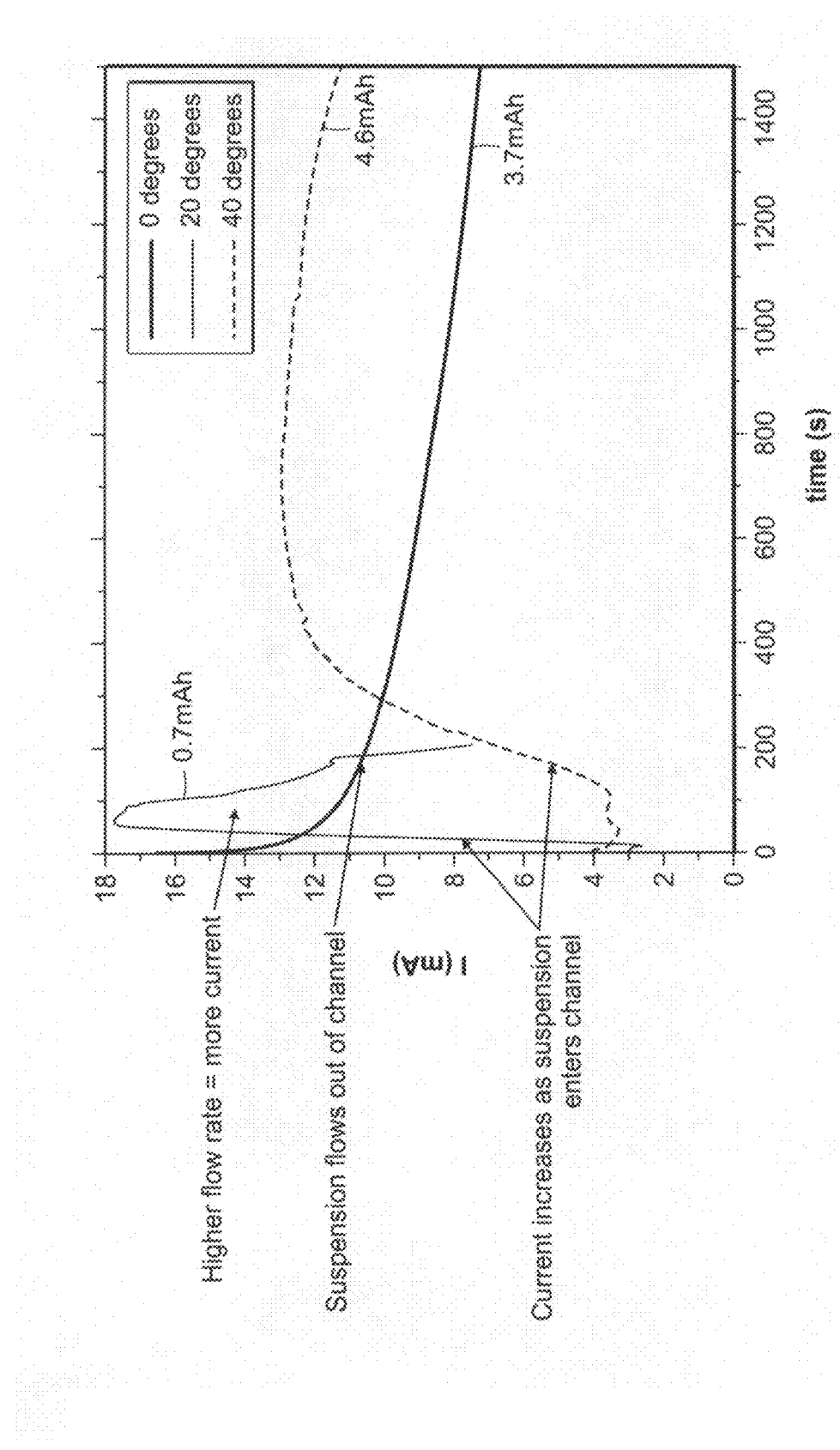
FIG. 5 is a graph of current versus time for an embodiment of the invention disclosed herein.

FIG. 5 present results of a prototype embodiment according to the invention. For this experiment, potentiostatic discharge was at 2.1V (to avoid precipitation of insoluble species). The flowable electrode used was 2.5MS (as in $Li_2S_8$) in TEGDME (1 wt % $LiNo_3$ with 0.5M Li TFSI) with 0.5 volume percent Ketjen black. The graph of FIG. 5 shows that a higher flow rate means more current. One can also see that current increases as the suspension enters a flow channel.

FIGS. 6 and 7 are additional embodiments of the invention. Additional ports in FIG. 6 are added to achieve greater uniformity in flow. The addition of multiple channels slow the central region of flow. The embodiment in FIG. 7 adds more ports and channels to achieve greater uniformity in flow. The ends of the channels are isolated to avoid bubble formation.

FIG. 8 illustrates an embodiment of the invention in which the redox solutions contain nanoscale conductor networks.

The state-of-charge of the cell 30 disclosed herein, corresponding to the working ion concentration in the negative and positive electrodes, may be changed in one or more flow passes of the electrode. When multiple passes are used to charge or discharge, the cell is inverted for each pass. The energy dissipated is limited primarily to the energy required to rotate and invert the cell.

In a preferred embodiment, the ratio of the internal volume of the energy-extraction region, also referred to as the "stack," to the volume of the reservoir varies from about 1 to about 100. Accordingly, the total energy and total charge/discharge time of the battery varies. For example, when the stack is operated at a 1C current rate, corresponding to the complete charge or complete discharge of the material within the stack in one hour, flowing the electrode at the rate of one stack volume per hour results in the discharge of the batteries' stored energy in about 10 hours. The gravity induced cell disclosed herein is particularly well suited to the use of high energy density flow electrodes as the ratio of stack volume to tank volume is generally higher, and the total system size smaller, for a given stored energy. Thus, the size of the unit that must be inverted is smaller and the dissipated energy for inversion is lower.

Pneumatic pressure may be used in addition to gravity. The flow rates may be modulated using valves located in the stack or tank or between the stack and tank.

In one embodiment, the stack contains an electronically conductive current collector through or adjacent, to which the flow electrode flows, and to which charge transfer occurs.

In some embodiments of the invention disclosed herein the current collector comprises carbon. The carbon may be selected from the group consisting of glassy carbon, disordered carbon, graphite, and nanoparticulate carbon including fullerenes, carbon nanofibers and carbon nanotubes, graphene, and graphene oxide. The carbon may be in the form of a carbon plate, plate with nonplanar surface features including channels, compacted fibers, woven fibers, paper or 3D reticulated foam. A stationary current collector may be a carbon coating on a support or substrate comprising an insulating or conductive material.

In another preferred embodiment the current collector is a metal or metal alloy such as aluminum, copper, nickel and stainless steel. The metal or metal alloy may be in the form of a metal plate, plate with nonplanar surface features including channels, compacted metal fibers, woven metal fibers, 3D reticulated metal foam. A stationary current collector may be a metal or metal alloy coating on a support or substrate comprising an insulating or conductive material.

In another preferred embodiment the current collector is a metal oxide, preferably an electronically conductive metal oxide such as indium-tin-oxide (ITO), titanium oxide with a oxygen/titanium atomic ratio less than 2, vanadium oxide with oxygen/vanadium atomic ratio less than about 2.5, ruthenium oxide, a transition metal oxide, a perovskite oxide including but not limited to $(La,Sr)MnO_3$, a spinel oxide including but not limited to spinels containing the transition metals Fe, Co, Mn and Ni, and mixtures and doped variants of such oxides including those doped to impart n-type or p-type electronic conductivity. The metal oxide may be in the form of a metal oxide plate, plate with nonplanar surface features including channels, metal fibers, or porous sintered metal oxide. A stationary current collector may be a metal oxide coating on a support or substrate comprising an insulating or conductive material.

In a particularly preferred embodiment, the flowable redox electrode is a suspension and the suspension may include conductor particles as well as active material particles. Due to the existence of a percolating electronically conductive network in such suspensions, the percolating network itself acts as an extended, mobile current collector allowing electrochemical reaction throughout the volume of the flow electrode. Such active materials suspensions have been described in U.S. Pat. No. 8,722,227 B2. Another preferred flowable redox electrode is metal sulfide composition such as described in PCT/US2014/014681. The flowable redox electrode working ion is an alkaline ion selected from the group consisting of $Li^+$, $Na^+$, $K^+$ and $Cs^+$. The working ion may also be a divalent ion of magnesium or calcium. The working ion may also be a trivalent ion of aluminum or yttrium. It is also preferred that the reservoirs and energy-extraction region include a slippery, low friction or non-wetting surface.

The flow electrode may comprise water as a solvent. The flow electrode may also be nonaqueous. In a particularly preferred embodiment, the flow electrode is a suspension that may include conductor particles. The suspension may include an electronically percolating network, which may comprise any of the solids mentioned including carbons, metal oxides, and metals and metal alloys. The suspension may be electronically conductive or a mixed electronic-ionic conductor.

In some embodiments of the invention the flow cell includes a flow positive electrode or a flow negative electrode. The flow battery may include a flow positive electrode and a flow negative electrode. It is preferred that the materials of the reservoir end of the stack are slippery, low friction materials that may have a nonwetting surface. In some embodiments, the contact angle of the flow electrode on a surface is greater than 45° or greater than 90°. It is preferred that a non-stick surface be used for the walls that are in contact with the flow electrodes. Such a surface promotes plug-flow characteristic for the fluid, and minimizes the residue in the flow channels during operation and maximizes energy efficiency. Such a surface also promotes uniform flow of the redox electrode in the channels of the stack.

A particularly preferred embodiment of the invention uses a Li-polysulfide suspension as the flow electrode. Such a flow electrode material optionally may include electronically conductive particles that form an electronically percolating network rendering the flow electrode electronically conductive. Because the suspension fluid comprises an ether-based solvent, a coating of thermoplastic or inorganic material insoluble in the solvent is desired. Suitable candidates include polytetrafluoroethylene (PTFE), fluorinated ethylene propylene, and boron nitride.

In one embodiment of the cell disclosed herein, the material that houses the suspension fluid is an ABS-like plastic that has a glass transition temperature of 39-46° C. and softens above 50° C. The surface of this material does not offer a non-stick property to the suspension fluid and a non-stick coating is therefore desired. Traditional methods of coating this material using a PTFE solution requires a curing temperature of 300° C. to obtain a non-porous coating that adheres to the wall. Alternatively, a non-stick material composing a thin film may be applied to the interior walls of the cell. In one example, a 0.02 cm thick film of PTFE with acrylic adhesive on one side is used. The walls of the cell are cleaned with ethanol and the PTFE film is carefully applied to the walls of the cell to prevent the formation of air pockets.

In one embodiment, the walls of the cell are cleaned with ethanol and a PTFE film is carefully applied to the walls to prevent formation of air pockets.

In another embodiment, the surface of the tanks or stack are rendered non-stick using a porous or nanoporous layer into which is infused a liquid that is immiscible with the liquid of the flow electrode.

Figure 9A:
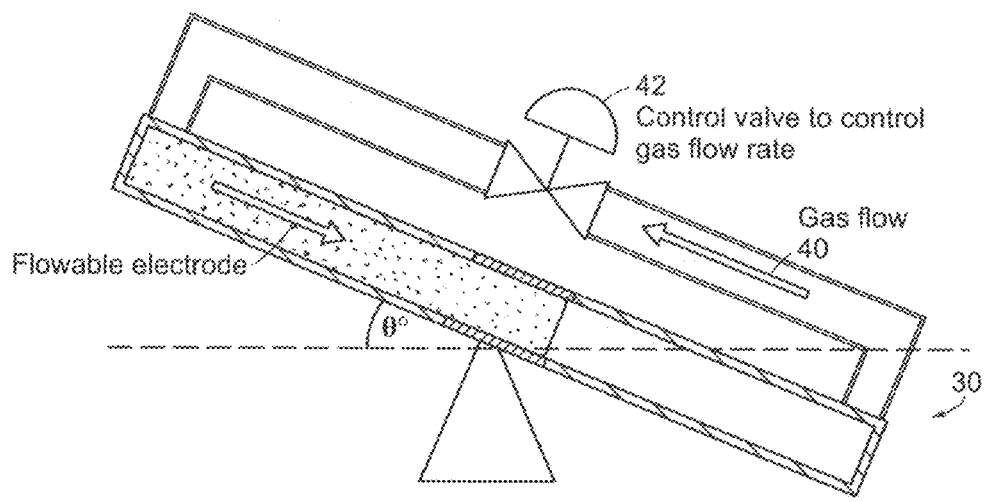
FIGS. 9a and 9b is a schematic illustration of a flow battery operating at θ° to induce flow by gravity with various proposed system for controlling the gas flow rate, which consequently controls the flow rate for the flowable electrode.
Figure 9B:
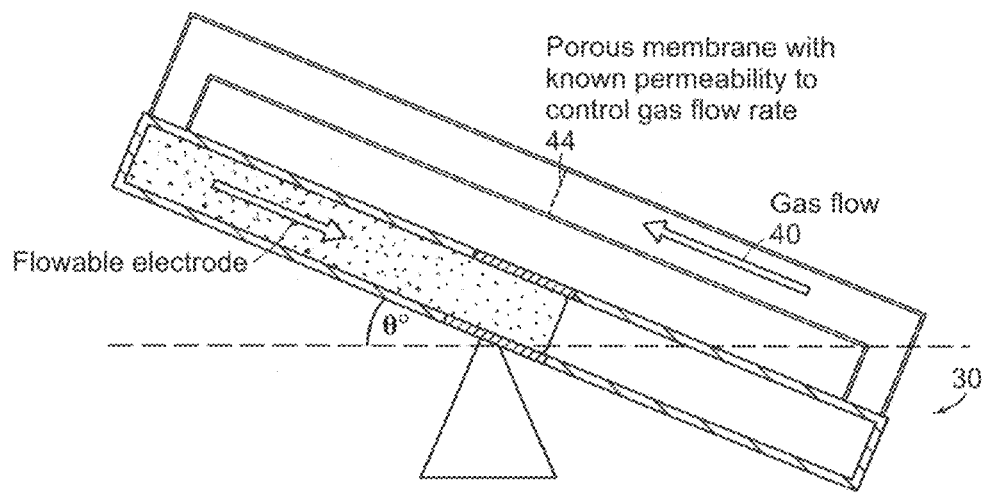

As shown in FIGS. 9a and 9b the design of the GIF cell can include a gas flow channel 40 which can be described as a pneumatic system. The gas flow of GIF cell 30 can be controlled by a flow control system, similar to any pneumatic system, which offers a resistance to the flow of air thus generating a pressure drop as the air flows (FIG. 9a). One embodiment of a flow control system is a control valve 42. The control valve 42 can be in the form of a gate valve, globe valve, pinch valve, diaphragm valve and needle valve. The valve can be operated manually or by power actuator. Another embodiment of a gas flow control system is the use of a permeable porous system such as a membrane system 44 or a cylinder of a porous media such as foam or filter (FIG. 9b). A porous system is primarily a porous layer of media with known permeability. The material for the porous system can be either organic (polymer) or inorganic (ceramic). The permeability of the system can be achieved by the following methods: (1) using another porous media/membrane with different permeability, (2) putting the porous media/membrane with same permeability in series, of (3) changing the effective area of the gas passing through the porous media/membrane.

Figure 10A:
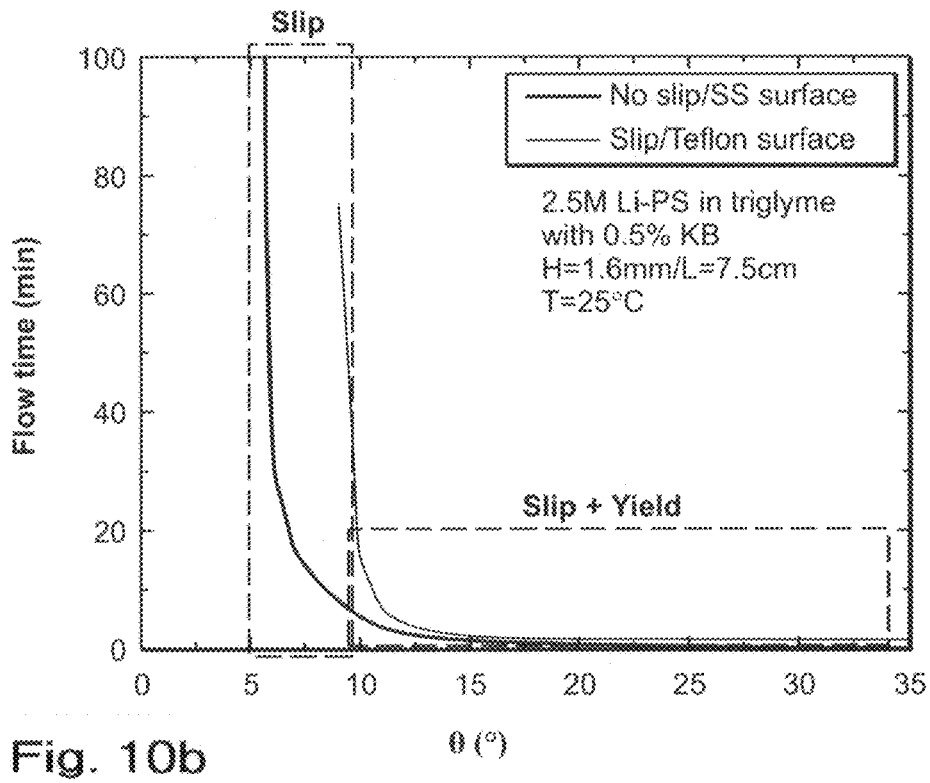
FIGS. 10a and 10b depicts the predicted flow time of 3.75 aliquots passing through the current collector region at different angle of operation with respect to the horizontal based on our theoretical model of GIF Cell. The model assumed no contact line pinning or flow instability.
Figure 10B:
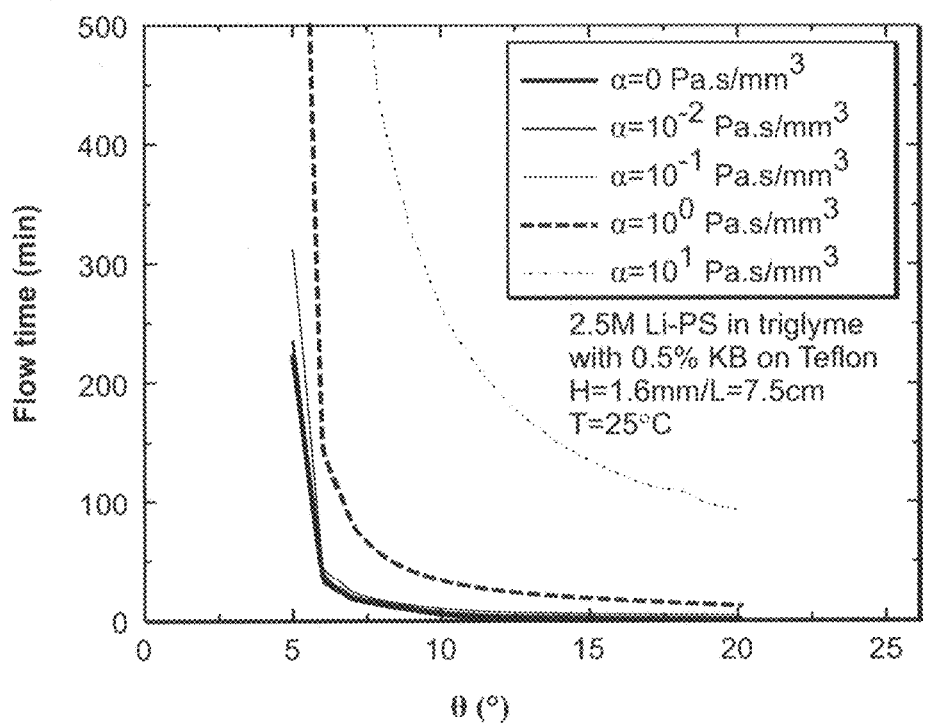

The use of a slippery surface affects the flow profile of the suspension at different angles in a given flow channel (FIG. 10a). Here, the term "aliquot" refers to the volume of the electrochemically active "stack" in between the "tanks." A slippery surface can be a surface of low surface energy such as Teflon. Another embodiment is also a Liquid Infused Surface where a liquid immiscible with the suspension is infused in a thin porous layer. Another embodiment is the use of superhydrophobic, oleophobic and/or omniphobic surfaces that do not stick to the suspension. For instance, having a high-slip surface (Teflon) allows the yield-stress suspension (0.5 vol % loading of carbon black in 2.5 M of lithium polysulfide) to start flowing at a lower angle (ca. 5°) compared to a stainless steel surface (FIG. 10a). The flow rate is also less sensitive to the change of angle in the region from 6° to 12° for the Teflon surface, which enables a better controllability of the flow for the flow cell. The flow profile of the suspension is dependent on the gas flow rate in the flow cell (FIG. 10b) according to the model. In this example, the gas flow rate can be tuned by α, a parameter representing the flow resistance of the flow control system and defined to be $$\alpha = \frac{\Delta P}{Q} = \frac{L\mu}{kA}$$

where L is the thickness of the membrane (m), μ is the viscosity of the gas (Pa·s), k is the permeability of porous membrane ($m^2$) and A is the cross-sectional area of the membrane ($m^2$). In general, we can define a parameter α that represents the flow resistance of the flow control system chosen that can be designed by the strategies discussed in the earlier paragraph. For example, $$\alpha = \frac{\Delta P}{Q}$$

for systems where air flow is linearly related to pressure such as membranes, porous media and viscous dominated flow in channels; or, $$\alpha = \frac{\Delta P}{Q^n},$$

where n>1 for inertia dominated flows and for more complex devices such as control valves.

In some preferred embodiments, the working ion of the battery is an alkali ion including, but not limited to, $Li^+$, $Na^+$, $K^+$, $Cs^+$. The working ion may be a divalent ion of magnesium or calcium. The working ion may also be a trivalent ion. In some embodiments the working ion is a trivalent ion including, but not limited to, aluminum or yttrium.

In some embodiments, the flow electrode is a suspension comprising a redox-active solution or suspension and a percolating network of conductive particles. The flow electrode may comprise a suspension of solid ion storage material particles including compounds that store ions by intercalation, by alloy, or by carrying out a conversion or displacement reaction. The flow electrode may be a metal-sulfide solution or suspension. In some embodiments, the metal sulfide system is lithium-sulfide, sodium-sulfide, or magnesium-sulfide. The gravity induced flow cell of the invention may be an energy storage device that is a flow capacitor. The energy storage device may be an electrolytic or electrochemical flow capacitor. The flow capacitor may include an aqueous or non-aqueous solvent. One or more of the flow electrodes of such a flow capacitor includes a suspension of carbon particles.

The gravity induced flow cell may be a hybrid device in which Faradaic as well as capacitive reactions take place, is a preferred embodiment, one of the electrodes stores charge through a Faradaic reaction and another electrode stores charge through capacitive storage. The capacitor electrode stores charge by absorption of charge or formation of an electrical double layer. In some embodiments, the capacitor electrode comprises particles of less than 10 micrometers, less than 1 micrometer, less than 0.1 micrometer, less than 0.01 micrometer, or less than 0.001 micrometer average particle diameter. In some embodiments of the invention, the flow electrode of the flow battery or flow capacitor is electronically conductive, having an electronic conductivity of at least $10^{-6}$ S/cm, at least $10^{-5}$ S/cm, at least $10^{-4}$ S/cm, at least $10^{-3}$ S/cm, at least $10^{-2}$ S/cm, at least $10^{-1}$ S/cm an or at least 1 S/cm.

It is recognized that modifications and variations of the invention will be apparent to those of ordinary skill in the art and it is intended that all suck modification and variations be included within the scope of the appended claims.

What is claimed is:

1. Gravity induced flow cell comprising:
   first and second reservoirs having a selected volume containing a flowable redox electrode;
   a membrane separating charged and discharged material;
   an energy-extraction region including electronically conductive porous current collectors through or adjacent to which the flowable redox electrode flows and to which charge transfer occurs; and
   structure for altering orientation of the flow cell continuously with respect to gravity in the range of about 0 to about 35 degrees whereby gravity passively induces flow of the flowable redox electrode along a flow direction between the first and second reservoirs without pumps and valves, wherein the structure is configured to change flow rate and power delivered on discharge or charge rate on charge by varying the angle of the cell with respect to gravity,
   wherein the first reservoir is disposed on a first end of the energy extraction region, the second reservoir is disposed on a second end, opposite the first end, of the energy extraction region, the first end and the second end defining an axis along the flow direction.

2. The flow cell of claim 1 further including a motor to vary angle of the cell.

3. The flow cell of claim 1 wherein the energy-extraction region has a volume and the ratio of the volume of the energy-extraction region to reservoir volume is selected to be in the range of about 1 to about 100.

4. The flow cell of claim 1 further including structure for providing pneumatic pressure to alter flow rate.

5. The flow cell of claim 1 further including valves to modulate flow rates.

6. The flow cell of claim 1 wherein the electronically conductive porous current collectors comprise carbon.

7. The flow cell of claim 6 wherein the carbon is selected from the group consisting of glassy carbon, disordered carbon, and graphite.

8. The flow cell of claim 6 wherein the carbon is in the form of compacted fibers, woven fibers, paper or 3D reticulated foam.

9. The flow cell of claim 1 wherein the electronically conductive porous current collectors are a metal or metal alloy.

10. The flow cell of claim 9 wherein the metal is selected from the group consisting of aluminum, copper, nickel and stainless steel.

11. The flow cell of claim 1 wherein the electronically conductive porous current collectors are coated with a metal or metal alloy.

12. The flow cell of claim 1 wherein the energy-extraction region comprises current collector plates.

13. The flow cell of claim 1 wherein the flowable redox electrode is a suspension.

14. The flow cell of claim 13 wherein the suspension includes conductor particles.

15. The flow cell of claim 1 wherein the reservoirs and energy-extraction region include a slippery, low friction or non-wetting surface.

16. The flow cell of claim 1 wherein the flowable redox electrode is a Li-polysulfide suspension.

17. The flow cell of claim 1 having a flowable redox electrode working ion that is an alkali ion selected from the group consisting of lithium, sodium, potassium and cesium.

18. The flow cell of claim 1 having a flowable redox electrode working ion that is a divalent ion of magnesium or calcium.

19. The flow cell of claim 1 having a flowable redox electrode working ion that is a trivalent ion of aluminum or yttrium.

* * * * *